June 14, 1949. T. R. HARRISON ET AL Re. 23,121

ANTIHUNTING ELECTRICAL MEASURING AND CONTROL APPARATUS

Original Filed Nov. 15, 1938 5 Sheets-Sheet 1

INVENTORS
THOMAS R. HARRISON
WALTER P. WILLS

BY Arthur H. Swanson

ATTORNEY

INVENTORS
THOMAS R. HARRISON
WALTER P. WILLS
BY
Arthur H. Swinson
ATTORNEY

INVENTORS
THOMAS R. HARRISON
WALTER P. WILLS
BY
Arthur H. Swanson
ATTORNEY

June 14, 1949. T. R. HARRISON ET AL Re. 23,121

ANTIHUNTING ELECTRICAL MEASURING AND CONTROL APPARATUS

Original Filed Nov. 15, 1938 5 Sheets-Sheet 4

INVENTORS
THOMAS R. HARRISON
WALTER P. WILLS

BY Arthur H. Swanson

ATTORNEY

June 14, 1949. T. R. HARRISON ET AL Re. 23,121

ANTIHUNTING ELECTRICAL MEASURING AND CONTROL APPARATUS

Original Filed Nov. 15, 1938 5 Sheets-Sheet 5

INVENTORS
THOMAS R. HARRISON
WALTER P. WILLS
BY
Arthur H. Swanson
ATTORNEY

Reissued June 14, 1949

Re. 23,121

UNITED STATES PATENT OFFICE 23,121

ANTIHUNTING ELECTRICAL MEASURING AND CONTROL APPARATUS

Thomas R. Harrison, Wyncote, and Walter P. Wills, Philadelphia, Pa., assignors, by mesne assignments, to Minneapolis-Honeywell Regulator Company, Minneapolis, Minn., a corporation of Delaware Original No. 2,300,742, dated November 3, 1942, Serial No. 240,594, November 15, 1938. Application for reissue January 22, 1949, Serial No. 72,182

31 Claims. (Cl. 318—28)

The present invention relates to a method of and apparatus for preventing hunting in automatic recording and control systems.

A general object of the invention is to provide an effective method of and apparatus for regulating a condition such as mechanical, electrical, chemical, physical, etc., in such a manner as to prevent hunting.

A specific object of the invention is to provide stationary anti-hunting means for use in recording and/or controlling systems.

A further object of the invention is to provide a temperature recording and/or controlling system that shall embody means for preventing hunting.

In accordance with one embodiment of the invention, a self-balancing system including an electromotive force varying in accordance with the variation in magnitude of a condition under measurement, or in accordance with the departure from a predetermined magnitude of the condition, includes means for applying the said electromotive force to unbalance a normally balanced electrical network and thereby to initiate operation of a driving system having inertia to effect a rebalancing adjustment of the network. The means referred to includes suitable provisions for so delaying the application of the full change in said electromotive force in unbalancing the electrical network on a variation in the condition under measurement that the inertia of the driving system is compensated for and hunting or oscillation of the said system about the balance point is prevented. The delaying means are of such character that the operation of the driving system is effective substantially immediately in effecting rebalance of the network whereby the operation of the driving system will be proportional to the extent of network unbalance. By providing such delaying means the full extent to which the network will be unbalanced on a change in the said electromotive force is not immediately applied to produce operation of the driving system, but is applied thereto in accordance with the inertia of said system to thereby compensate for such inertia and prevent hunting of said system. Thus, the driving system will decelerate as the full unbalance of the network is reduced and gradually eases into the balanced position without exceeding it.

Provisions for preventing overshooting of the network are desirable since the inertia of the various mechanically connected parts tend to so operate as to carry the driving system and associated rebalancing means beyond the proper position of rebalance. When such a condition of overshooting prevails, the network then becomes unbalanced in the opposite direction and initiates operation of the driving system to obtain rebalance but again the necessary regulation is exceeded to thereby set up a continuous hunting of the driving system about the balance point.

The need for anti-hunting provisions in recording and controlling apparatus has long been recognized and various methods have been proposed for obtaining the same. One such prior art method for preventi.. hunting is disclosed in Patent 1,827,520 issued to Thomas R. Harrison on October 13, 1931, for Recording and control systems and apparatus therefor in which the speed of rebalance of an electrical network is effected in accordance with the extent of unbalance thereof, and mechanically moving means are provided for maintaining proportionality between the extent of unbalance and speed of rebalance.

In the practical carrying out of the present invention, for example, in controlling the temperature of a furnace, we may employ a device such as a thermocouple as the means responsive to the temperature of the interior of the furnace, and apply the thermal electromotive force developed by the heat of the furnace through a resistance of suitable value to charge a condenser and measure the charge on the condenser to determine the temperature of the furnace. In one practical embodiment of our invention the electromotive force between the condenser terminals is compared to a standard or known electromotive force across a slidewire resistance having a contact adjustable along the length thereof for tapping off any portion of the total electromotive force across the slidewire. A suitable detecting device is connected in circuit with the known and unknown electromotive forces and initiates the operation of a reversible motor having a mechanical connection to the slidewire contact and adapted to adjust the latter along the length of the slidewire to render the known and unknown electromotive forces equal and opposite. In the operation of the apparatus the electromotive force across the terminals of the condenser gradually builds up to a value equal to the thermal electromotive force and on a change in the latter does not instantaneously follow such changes. As a result the full unbalance which will result between the electromotive force developed by the thermocouple and that tapped off the slidewire resistance on a given change in thermal electromotive force is not immediately applied to the detecting device but is gradually applied thereto. By properly proportioning the values of the condenser and the resistance through which the condenser is charged by the thermal E. M. F. to the resistance of the detecting device and the slidewire, the rate at which the network unbalance is applied to said detecting device may be adjusted as required to exactly compensate for the inertia of the detecting device, the driving motor and the mechanical connection to the slidewire contact. Thus, the speed of the motor in effecting rebalance may be extremely high without overshooting of the balance point taking place.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described a preferred embodiment of the invention.

Figure 1:
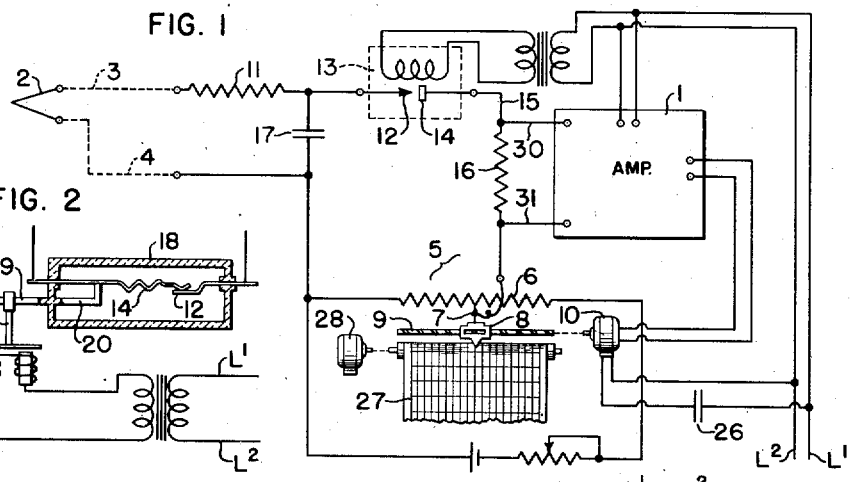
Fig. 1 is a diagrammatic representation of the use of the invention in a potentiometric recording system.
Figure 3:
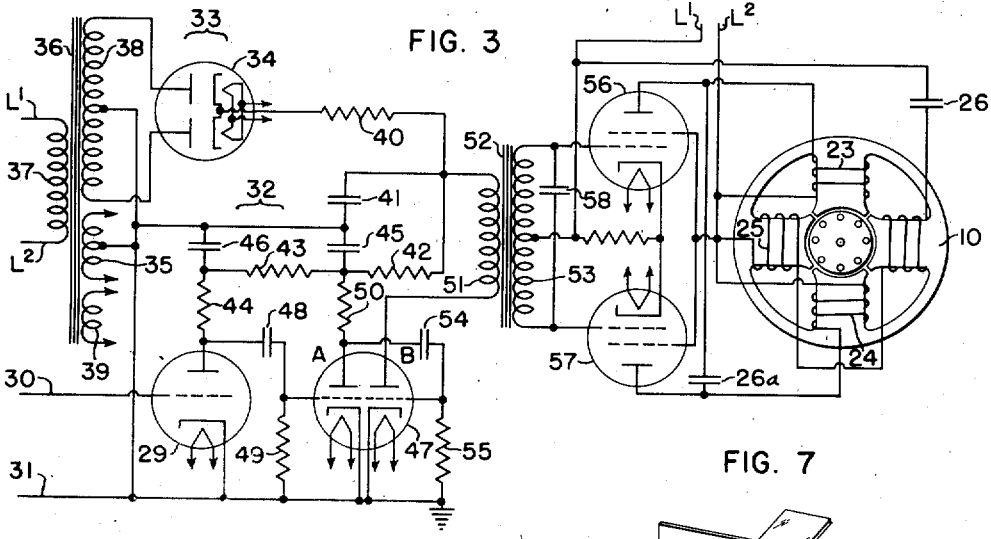
Fig. 3 illustrates schematically a form of amplifier that may be employed in the Fig. 1 arrangement.

Referring more particularly to Fig. 1 of the drawings there is illustrated in schematic form an arrangement including an electronic device 1, shown in detail in Fig. 3, for producing effects in accordance with the extent of unbalance of a potentiometer network which controls the electronic device and is unbalanced in accordance with variations in a quantity to be measured, and in which because of the small magnitude of the unbalanced electromotive forces it is not practical nor desirable to have the said effects produced directly by the potentiometric network.

More specifically, an arrangement is illustrated in Fig. 1 for measuring and recording the temperature of a furnace (not shown) in the interior of which a thermocouple 2 is arranged in heat transfer relation therewith and is responsive to slight changes in temperature therein. The thermocouple, which may be located at a distance from the remainder of the measuring apparatus, has its terminals connected by a pair of conductors 3 and 4 to the terminals of a null point potentiometric network 5. The potentiometric network 5 includes a slidewire resistance 6 and an associated contact 7, which is capable of being moved along the length of the slidewire, and may be of any suitable type, for example, such as the Brown potentiometric network disclosed in Patent 1,898,124 issued to Thomas R. Harrison, February 21, 1933.

The movable contact 7 of the potentiometer is attached to a suitable carrier which, for example, may be in the form of an internally threaded nut 8 adapted to ride on a screw threaded rod 9 which is rotated in one direction or the other under control of the thermocouple 2. A suitable motor 10 is provided and is coupled in any convenient manner to the screw threaded rod to rotate the latter at the desired speed and in the desired direction and thereby to move the contact 7 along the slidewire resistance 6 to rebalance the potentiometer when the latter is unbalanced.

One terminal of the thermocouple 2 is connected by the conductor 4 directly to the left end of the slidewire resistance 6, as seen in Fig. 1, and the other terminal of the thermocouple is connected by the conductor 3, in which a resistance 11 is inserted, to one terminal 12 of an interrupter or converting device 13 described in detail hereinafter in connection with Fig. 2, and a second terminal 14 of the interrupter is connected by a conductor 15, in which a resistance 16 is inserted, to the contact 7. The function of the resistance 11 and an associated condenser 17 which is connected from the end of resistance 11 remote from the thermocouple to the left end of the slidewire resistance 6 is to prevent hunting of the system and will be explained in detail hereinafter.

Figure 2:
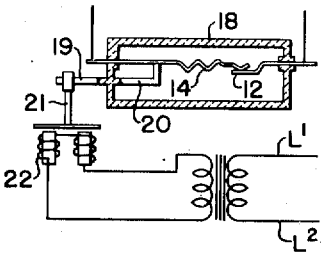
Fig. 2 illustrates in detail a form of interrupter that may be employed in the arrangement of Fig. 1.

The interrupter 13, illustrated schematically in Fig. 1 and in greater detail in Fig. 2, operates to convert the potentiometer unbalance direct currents into pulsating currents capable of being readily amplified. It will be understood any desired form of interrupter may be employed, but in order to illustrate an operative form the interrupter shown in detail in Fig. 2 may be employed, said interrupter consisting of a vacuum tube 18 in which metal terminals or contacts 12 and 14 are arranged. The tube 18 may desirably be formed of glass and has a diaphragm at one end which is resilient and integral with a rod 19 the latter of which has an end 20 normally resting against the underside of the contact 14 so that upon movement of the rod 19 downward, the contact 14 is raised out of engagement with the contact 12 to thereby break the circuit at that point. As soon as the rod 19 is moved upward, the contact 14 will move downward into engagement with the contact 12 to again close the circuit. The rod 19 is operatively connected by means of a link 21 to a vibrator 22 which may be of an electromagnetic type, as shown, and receives energizing current from alternating current supply lines $L^1$ and $L^2$, which may desirably, although not necessarily, be a source of 60 cycle current. On energization of the vibrator 22, the contact 14 will alternately be raised and lowered thus intermittently breaking the circuit between the contacts. It is noted the vibrator may desirably be polarized so that the contacts 12 and 14 will be interrupted at the supply line frequency.

The periodic interruption of the unbalanced current which flows in the potentiometric network 5 when an unbalanced condition obtains produces a pulsating potential drop across the resistance 16, which potential drop is either in phase with the voltage of the supply lines $L^1$ and $L^2$ or is displaced 180° in phase. This pulsating potential drop is impressed on the input terminals of the electronic amplifier 1 wherein it is amplified and the amplified quantity is applied to the terminals of one winding 23 or 24 of the reversible motor 10 which, as illustrated, in detail in Fig. 3, also includes a winding 25 connected to the supply lines $L^1$ and $L^2$ through a suitable condenser 26.

The reversible motor 10 is of the induction variety and includes a squirrel cage rotor and two pairs of oppositely disposed field poles on which the windings 23, 24 and 25 are wound. Winding 23 is wound on one field pole of said pair, and winding 24 is wound on the other pole of said pair. Winding 25 is wound on the other pair of field poles and due to the action of condenser 26, the current which flows through the winding 25 will lead the line current by approximately 90°. The current supplied the winding 23 by the amplifier 1 is in phase with the supply line voltage and establishes a field in the rotor which is displaced 90° in the forward direction with respect to that established therein by the winding 25. Similarly, the current supplied winding 24 is in phase with the supply line voltage but since it is wound on an opposite field pole from that on which the winding 23 is wound, winding 24 establishes a field in the rotor which lags by 90° that established by winding 25. Reaction between the field set up by winding 23 or 24 with that set up by winding 25 establishes a rotating field in the rotor which rotates in one direction or the other dependent upon whether winding 23 or 24 is energized and thus on the direction of potentiometer unbalance. The motor rotor is connecter through suitable gearing or couplings (not shown) to the screw threaded shaft 9 so that the contact 7 is adjusted along the slidewire resistance 6 in accordance with the direction of rotation of the rotor. The direction and duration of rotation of the rotor is controlled by the direction and extent of unbalance of the potentiometer so that on motor rotation the contact 7 is adjusted in the proper direction to reduce the potentiometer unbalance.

In order that the speed of motor 10 may be as great as possible without overshooting of the new balance point of the potentiometric network 5 and consequent hunting taking place, means have been provided to insure that the motor speed is reduced to zero as the balance point is reached. This end is obtained by providing the arrangement including the resistor 11 and condenser 17, as shown.

With the resistance 11 and condenser 17 connected as shown, it will be apparent the thermocouple 2 operates to charge the condenser 17 through the resistance 11 and the electromotive force thus developed between the condenser terminals is compared with the potentiometer electromotive force at the then position of the contact 7. The resistance 11 is preferably of such value that the total resistance of the circuit including the thermocouple 2, leads 3 and 4 and the resistance 11 is several times greater than that of the circuit including the potentiometer slidewire 6, resistance 16, and the interrupter contacts 12 and 14 when the latter are in engagement. The operation of this arrangement for preventing hunting will now be described.

With the temperature of the furnace, to which the thermocouple is responsive, at a predetermined value, the condenser 17 will tend to be charged through the resistance 11 until the condenser electromotive force is equal to that of the thermocouple. The contact 7 will then be in a position along the slidewire resistance 6 such that the electromotive force tapped off the slidewire 6 is exactly equal and opposite to the condenser electromotive force. For convenience, when the slidewire electromotive force is referred to hereinafter, that portion tapped off resistance 6 and opposed to the condenser electromotive force is the electromotive force intended. On a change in the temperature of the furnace, for example, on an increase in temperature, the thermal electromotive force will increase and operate to charge the condenser 17 further and thereby increase the electromotive force developed across the condenser terminals. The flow of current through resistance 11 will produce a potential drop across the latter and, as a result, the electromotive force developed across the condenser terminals will not assume the final value of the thermal electromotive force until the current through resistance 11 is reduced to zero, or in other words, until the system is again balanced. Thus, until the slidewire electromotive force is adjusted to the new value of thermocouple electromotive force, the electromotive force developed on the condenser will tend to assume a value intermediate the thermocouple and slidewire electromotive forces. The flow of current through resistance 16 on unbalance of the condenser and potentiometer electromotive forces will operate substantially immediately to produce energization of motor 10 for rotation to effect adjustment of the contact 7 in the proper direction to reduce the unbalance between the condenser and potentiometer electromotive forces. It is noted that while the currents which flow through the resistance 16 result primarily from changes in the thermocouple electromotive force, the magnitude of those currents is determined solely by the relative values of the condenser and potentiometer electromotive forces. That is to say, the current flow through resistance 16 will be reduced to zero, irrespective of the value of the thermocouple electromotive force, when the condenser and slidewire electromotive forces are equal and opposite. In other words, the amplifier 1 responds to changes in thermocouple electromotive force only in so far as the latter changes the condenser electromotive force.

It is noted there is no delay means in the circuit through which the condenser and slidewire electromotive forces are opposed so that the amplifier 1 responds substantially immediately to unbalance in said electromotive forces to energize the motor 10 for rotation in one direction or the other to change the slidewire electromotive force as required to reduce the unbalance, and reduces the motor energization to zero at the instant the balance between the said electromotive forces is restored. Due to the inertia of the motor, however, the speed of the latter will not fall off as quickly as the energization thereof and consequently the slidewire electromotive force will overshoot the instantaneous value of the condenser electromotive force. As a result the potentiometric network will be momentarily unbalanced in the opposite direction, which unbalance will produce an effect energizing the motor for rotation in the reverse direction to thereby quickly decelerate the latter. Inasmuch as the condenser electromotive force differs from the thermocouple electromotive force by an amount equal to the potential drop produced across resistance 11 by the flow of current therethrough, the contact 7 will not have reached the position along slidewire resistance 6 corresponding to the new value of thermocouple electromotive force at the instant when the condenser and slidewire electromotive forces were exactly balanced. It is noted that after the condenser and slidewire electromotive forces are balanced the condenser will not assume the thermocouple electromotive force until the lapse of a predetermined interval required to charge the condenser to the thermocouple potential, and by making this interval of the proper duration, the motor will be decelerated and ease the contact 7 gradually into said position without overshooting it. The proper adjustment of the duration of the lag between the condenser and thermocouple electromotive forces may be readily effected by properly proportioning resistance 11 and condenser 17 in relation to the effective resistance of the circuit including the contacts 12 and 14 and resistances 6 and 16. Thus, on a change in thermocouple electromotive force, the motor will effect an adjustment of the contact 7 along the slidewire resistance 6 and closely adjacent the balance position the motor speed will be quickly decelerated and said motor will come to rest with the contact 6 at the exact balance position. If, for any reason, the motor should stop short of the exact balance position, the condenser 17 will be further charged to thereby produce a torque actuating the motor for rotation in the proper direction, thereby insuring that the system will be adjusted to the exact balance position. It is noted the motor may be extremely fast in its rebalancing effect and is capable of moving the contact 7 completely along the length of the slidewire resistance, a distance approximately twelve inches, in some cases, in a fraction of a second without overshooting taking place.

If desired, a pen may be mounted on the carriage 8 which carries the potentiometer contact 7 and arranged in cooperative relation with a recorder chart 27 to thereby provide a continuous record of the temperature of the furnace in which the thermocouple 2 is inserted. The chart 27 may be a strip chart, as shown, and is adapted to be driven in any convenient manner, as for example, by a unidirectional motor 28 through suitable gearing (not shown), so that a record of the temperature to which the thermocouple 2 is subjected will be recorded as a continuous line on the chart.

The electronic amplifier 1 referred to is illustrated in detail in Fig. 3 and, as shown, includes an electronic valve 29 which is preferably a heater type high mu triode having an anode, cathode, and a control electrode, and having its input circuit connected by conductors 30 and 31 to the terminals of the resistance 16. Anode voltage is supplied the valve 29 from the terminals of a suitable filter 32 which is connected in circuit between the valve 29 and a rectifier 33. The rectifier 33 is a conventional full wave rectifier employing a rectifier valve 34 including two heater type diodes in one envelope. Energizing current is supplied the heater filaments of the diodes from the low voltage secondary winding 35 of a transformer 36 which also includes a line voltage primary winding 37, a high voltage secondary winding 38, and a second low voltage secondary winding 39. The anode of one diode of valve 34 is connected to one terminal of the winding 38 and the anode of the second diode is connected to the other terminal of the winding. The cathodes of the diodes are connected together and through a resistance 40 to the positive terminal of the filter 32, and the negative terminal of the latter is connected to a center tap on the winding 38. The negative terminal of the filter is desirably connected to ground potential, as shown.

The filter 32 includes a condenser 41 which shunts its positive and negative terminals, and has its positive terminal connected to the anode of valve 29 through resistances 42, 43 and 44, and its negative terminal connected directly to the cathode of said valve. As illustrated, the point of engagement of resistances 42 and 43 is connected by a condenser 45 to the negative terminal of the filter and the point of engagement of resistances 43 and 44 is connected by a condenser 46 thereto.

Energizing current is supplied the heater filament of valve 29 from the low voltage transformer winding 39 which also supplies energizing current to the heater filaments of a twin type valve 47. The flow of current through valve 29 is normally maintained at a mean value since the resistance 16 is connected directly across the input circuit thereof, but when a pulsating potential appears across the terminals of resistance 16, the conductivity of valve 29 is alternately increased and decreased resulting in a pulsating potential drop appearing across the resistance 44 in the output circuit of the valve 29.

The output circuit of valve 29 is resistance capacity coupled to the input circuit of valve 47 through a condenser 48 and a resistance 49 connected across the input circuit of valve 47. Valve 47, is a heater type valve including two triodes in one envelope. Each triode includes anode, cathode, and control electrode elements. For convenience, the triode having the resistance 49 connected across its input circuit will be referred to as the triode A and the second triode will be referred to as the triode B.

Anode voltage is supplied the triodes A and B from the terminals of the filter 32 and, as shown, the anode of triode A is connected through a resistance 50 to the point of engagement of resistance 42 and 43 and the anode of triode B is connected through the primary winding 51 of a transformer 52 to the positive terminal of the filter. The cathodes of triodes A and B are connected together and to the negative terminal of the filter.

The output circuit of triode A is resistance capacity coupled by a condenser 54 and a resistance 55 to the input circuit of triode B, and the output circuit of the latter is coupled by transformer 52 to the input circuit of a pair of electronic valves 56 and 57 connected in push-pull. Transformer 52, includes a center tapped secondary winding 53 the terminals of which are connected to a respective control electrode of the valves 56 and 57 and the center tap of which is connected through a biasing resistance to the cathodes of the valves, which, as shown, are connected together. As illustrated, a condenser 58 may desirably be connected across the terminals of the transformer secondary winding 53 for tuning the latter to the frequency it is desired to amplify. Valves 56 and 57 are heater type tetrodes and include anode, cathode, heating filament, control electrode, and screen elements.

Anode voltage may be supplied the valves 56 and 57 directly from the supply conductors $L^1$ and $L^2$, as shown, or may be supplied thereto from a suitable transformer energized by the supply line current, if desired. Winding 23 of motor 10 is connected in the anode circuit of valve 56 and winding 24 of the motor is connected in the anode circuit of the valve 57. In operation, when a pulsating potential drop is produced across resistance 16 as a result of potentiometer unbalance, the resulting amplified pulsating current flows through the transformer primary winding 51 will cause the induction of an alternating voltage across the terminals of the transformer secondary winding 53, which voltage is impressed on the input circuits of valves 56 and 57. The alternating voltage which appears across the terminals of the transmormer winding 53 swings the potentials of the control electrodes of the valves 56 and 57 in opposite phase at a frequency corresponding to the supply line frequency, and thereby renders one valve or the other non-conductive depending upon the phase of the voltage of the transformer secondary winding 53 with respect to the supply line voltage. The resulting deenergization of one motor winding 23 or 24 and the increased energization of the other operates to produce rotation of the motor in one direction or the other depending upon the phase of the pulsating potential drop produced across resistance 16 and thereby the direction of potentiometer unbalance. As illustrated, a condenser 26*a* may desirably be connected between the anodes of valves 56 and 57 to increase the available torque of motor 10.

Figure 4:
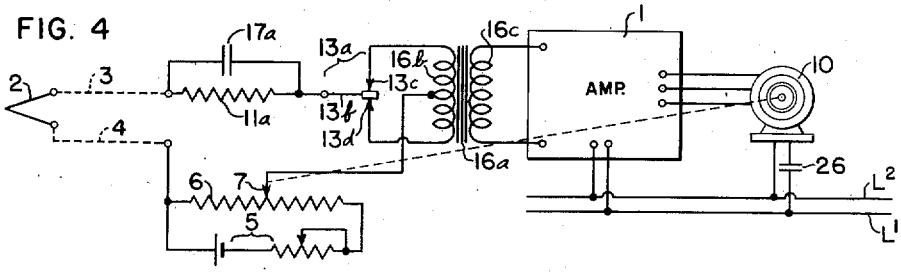
Fig. 4 illustrates a modification of the Fig. 1 arrangement.

In Fig. 4 we have illustrated, more or less diagrammatically, a modified form of our invention embodied in a self-balancing potentiometer recording system of the general type described in connection with Fig. 1. In this modified arrangement the potentiometric network 5 and the input circuit of the amplifier 1, which amplifer may be identical with the correspondingly identified part of Fig. 1 and described in detail in Fig. 3, are coupled by a transformer 16*a* having a center tapped primary winding 16*b* and a secondary winding 16*c*, and a double contact interrupter 13*a* is employed for chopping the unbalance potentiometer currents to permit easy amplification thereof. A modified anti-hunting circuit connection is provided in this arrangement, which modified circuit includes a resistance 11*a* inserted in the thermocouple lead 3 and a condenser 17*a* which, as indicated, is connected across the said resistance. The operation of this anti-hunting arrangement will be explained further hereinafter.

Figure 7:
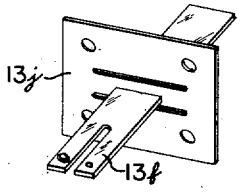
Figs. 5–7 illustrate in detail a form of interrupter that may be employed in the arrangement of Fig. 4.
Figure 5:
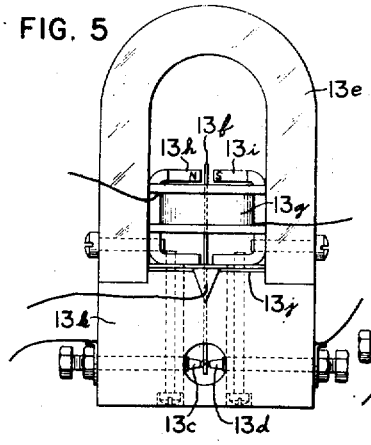
Figure 6:
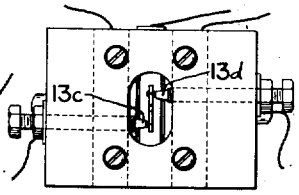

As illustrated in Fig. 4 and in greater detail in Figs. 5–7, the interrupter 13*a* includes an arm or flexible reed 13*f* which is adapted to be vibrated and is preferably in engagement with a pair of contacts 13*c* and 13*d* when in a mid-position but disengages one contact when moved in one direction and disengages the other contact when moved in the opposite direction. The contact 13*c* is connected to one terminal of the primary winding 16*b* of transformer 16*a* and the contact 13*d* is connected to the other terminal of the winding. The reed 13*f* is vibrated at a frequency identical with that of the supply lines $L^1$ and $L^2$ and operates to cause the flow of unbalance potentiometer currents alternately through the opposite halves of the transformer primary winding 16*b* to thereby cause the induction of a voltage in the transformer secondary winding 16*c*, which voltage is in phase, or displaced 180° in phase, with the supply line voltage depending upon the direction of potentiometer unbalance. The voltage so induced in the winding 16*c* is amplified by the amplifier 1 and the amplified quantity is employed to cause the selective energization of motor 10 for rotation in one direction or the other and thereby adjustment of the contact 7 in the proper direction along the slidewire resistance 6 to rebalance the potentiometer. It is noted that by employing the double contact interrupter and the center tapped primary winding 16*b* stray E. M. F.'s of the same frequency as the line frequency which may be induced in the thermocouple leads or potentiometer slidewire resistance 6 are cancelled out in the transformer 16*a*. This feature is desirable in practical embodiment of systems utilizing our present invention.

The operation of the anti-hunting means provided is this arrangement will now be explained. In operation, when the potentiometer is balanced, the current flow through resistance 11*a* will be zero and consequently there will be no charge on condenser 17*a*. On a change in thermocouple E. M. F., however, resulting in potentiometer unbalance, the flow of unbalance potentiometer current will begin charging the condenser 17*a* to develop an electromotive force across the condenser terminals which thereafter will be discharged through resistance 11*a*.

It is noted that at the instant the thermocouple voltage begins to change, the condenser 17*a* will have no effect on the system but as soon as the unbalance currents begin to charge the condenser an electromotive force is gradually built up on the condenser which electromotive force reduces the flow of unbalance currents and thereby produces a delay in the application of the full change in the thermoelectric voltage on the potentiometric network. Specifically, the condenser will be charged by the flow of unbalance currents and the polarity of the charge will be in opposition to the unbalance electromotive force to thereby reduce the portion of the unbalance electromotive force to which the amplifier 1 is responsive. Thus, as in the arrangement of Fig. 1, the motor energization will fall off as the unbalanced potentiometric electromotive force is reduced and will coast beyond the position at which its energization is entirely cut off to thereby unbalance the potentiometer in the opposite direction. The motor will then be energized for rotation in the opposite direction and quickly come to rest with the contact 7 at the exact balance point. By properly proportioning the resistance 11*a* and condenser 17*a* to the effective resistance of the vibrator contacts, winding 16*b*, and resistance 6, the amount by which the condenser reduces the application of the full change in thermocouple electromotive force to the amplifier 1 may be made precisely that required to prevent overshooting of the balance point by the motor.

It is noted that while the anti-hunting arrangement of Fig. 4 differs somewhat in structure from that disclosed in Fig. 1 they both have in common extreme simplicity and ability to prevent hunting of a mechanical rebalancing action without requiring the use of physically movable devices. It will be understood that the anti-hunting arrangement of Fig. 4 may be employed with equal facility in the system of Fig. 1 and vice versa.

The mechanical construction of a preferred form of interrupter is illustrated in detail in Figs. 5–7 wherein it will be seen the interrupter includes a U-shaped permanent magnet 13*e*, a deflecting member or reed 13*f* shown more in detail in Fig. 7 and an actuating coil 13*g*. Coil 13*g* has its terminals connected to the alternating current supply conductors $L^1$ and $L^2$ through a suitable transformer (not shown) and is rigidly supported by two U-shaped soft iron members 13*h* and 13*i* the latter of which are attached by screw means to the inner surface of a respective pole of magnet 13*e*. The members 13*h* and 13*i* are arranged with their legs facing each other and separated by a distance sufficient to permit a small movement of the deflecting element 13*f*, which element, as shown, is positioned between said legs and also extends through the center portion of coil 13*g*.

As shown in Fig. 7, the deflecting element 13*f* comprises a flexible metallic reed having a slit at one end which extends for a portion of the length of the reed to divide that end of the latter into two legs each of which carries an electrical contact, one of the contacts being arranged on the upper side of the reed and the other contact being arranged on the lower side as seen in the drawings. The reed 13*f* is carried by a rectangular metallic plate 13*j* and is rigidly secured thereto as for example by soldering or welding, being so arranged with respect to the plate that one half of the reed extends at right angles from one side of the plate and the other half of the reed extends at right angles from the other side of said plate. As illustrated, slits somewhat longer than the width of reed 13*f* are provided in the plate 13*j* above and below the said reed so that when the plate is held stationary, the reed may be deflected relatively to the plate, and if deflected and suddenly released, will vibrate.

As illustrated in Fig. 5, the plate 13*j* is supported by the lower legs of members 13*h* and 13*i* and is held tightly against said legs by a Bakelite block 13*k*, which in turn is attached by screw means passing through the said block and the plate 13*j* and threaded into the legs of members 13*h* and 13*i*. Block 13*k* is provided with an oval opening into which the slitted end of reed 13*f* extends, and also carries the contacts 13*c* and 13*d* which are normally in engagement with a respective contact carried by that end of reed 13*f*. On deflection of the reed 13*f*, however, the slitted end thereof will bend slightly to thereby break the contact at a contact 13*c* or 13*d* according to the direction of deflection. Thus, when the reed is vibrated, the contact at 13*c* and 13*d* will periodically and alternately be opened to effect the desired action described hereinbefore.

Such vibration of reed 13*f* is produced in a manner to be described when coil 13*g* is energized by alternating current. When coil 13*g* is so energized the upper half of reed 13*f* will become magnetized in opposite directions at the supply line frequency, and reaction of the magnet so produced with the poles of magnet 13*e* will operate to deflect the reed first in one direction and then in the opposite direction at the supply line frequency to thereby cause an opening action at each of the opening contacts 13*c* and 13*d* once in each cycle of said frequency. It is noted that the lower legs of members 13*h* and 13*i* do not aid in producing vibration of reed 13*f*, but may desirably be provided to shield the lower end of said reed from stray lines of magnetic flux to prevent the induction therein of E. M. F.'s which will operate to introduce inaccuracy into the measurement. In order to obtain the maximum effect therefore, the ends of the lower legs to members 13*h* and 13*i* may desirably be closer together than the ends of the upper legs.

Figure 8:
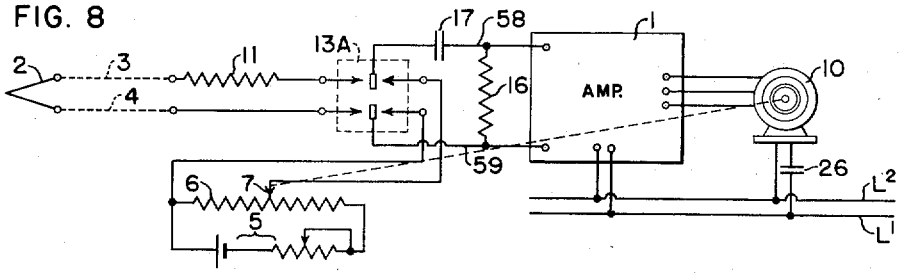
Fig. 8 illustrates a further modification of the arrangement of Fig. 1.

In Fig. 8 we have illustrated schematically a further modification of the arrangement of Fig. 1 wherein a double contact interrupter 13A is employed which operates to apply the thermocouple E. M. F. to the condenser 17 when in one position and to oppose the E. M. F. so developed on the condenser through conductors 58 and 59 and resistance 16 to the potentiometer E. M. F. when in an opposite position. The interrupter 13A is described in detail hereinafter in connection with Figs. 9 and 10 and when in the position last mentioned above isolates the thermocouple 2 and resistance 11 from the remainder of the network. The operation of this arrangement for eliminating any tendency of the system to hunt is the same as that of the Fig. 1 arrangement and hence further explanation is not believed necessary.

Figure 9:
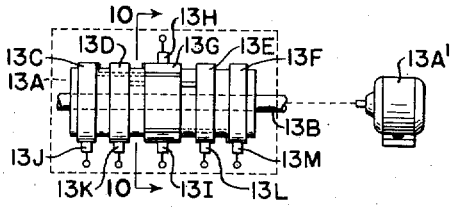
Figs. 9 and 10 illustrate in detail a form of interrupter that may be employed in the arrangement of Fig. 8.
Figure 10:
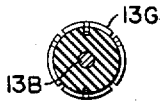

As illustrated in Figs. 9 and 10 the interrupter 13A includes a continuously rotating shaft 13B which may be driven by any suitable form of motor such as a synchronous motor 13A[1] and on which shaft are insulatingly mounted two pairs of slip rings 13C, 13D and 13E, 13F and a four segment commutator 13G, each segment being of the same arcuate length and all insulated from each other. Brushes 13H and 13I are provided for the commutator 13G and corresponding brushes 13J, 13K, 13L, 13M are provided for the slip rings 13C, 13D, 13E and 13F, respectively. The brushes 13H and 13I are connected to conductors 58 and 59 respectively, while the brushes 13J and 13K are connected to conductors 3 and 4, in the former of which the resistance 11 is inserted, and the brushes 13L and 13M are connected to one end terminal of slidewire resistance 6 and to contact 7 respectively. One opposite pair of segments on the commutator 13G are connected to the slip rings 13C and 13D and the other opposite pair of segments are connected to the slip rings 13E and 13F. Thus, during each cycle of rotation of the shaft 13B, one pair of segments on the commutator will be in engagement with the brushes 13H and 13I for a half cycle and during that time close the circuit from the thermocouple leads 3 and 4 to the conductors 58 and 59, and during the remaining half cycle the other pair of commutator segments will be in engagement with the said brushes to connect the potentiometer slidewire 6 in circuit with the leads 58 and 59. The speed of the motor 13A[1], which drives shaft 13B, is so adjusted that the time for one cycle of rotation of the shaft is identical with the time of one cycle of the alternating current supply lines $L^1$ and $L^2$.

Figure 11:
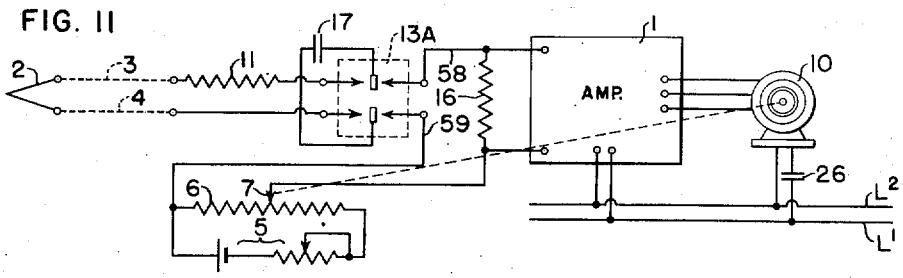
Figs. 11–15 illustrate further modifications of the Fig. 1 arrangement.

In Fig. 11 we have illustrated a modification of the Fig. 8 arrangement wherein the thermocouple 2 is isolated from the potentiometric network 5 and the amplifier 1 at all times. Such an arrangement is desirable when there is leakage between the thermocouple 2 and ground, either resistance or capacitance or both. Referring to Fig. 3 it will be noted the cathode of the input valve 29 of amplifier 1 is connected directly to ground so that if such a leakage path exists, a closed circuit will be established in which will flow stray currents which may be induced in the thermocouple leads, or established due to electrolytic action between the thermocouple and ground to introduce inaccuracy into the measurement. The operation of this arrangement for eliminating any tendency of the system to hunt is the same as that of the Fig. 1 arrangement and, hence, further explanation is not believed necessary.

In this modified arrangement the resistance 16 and conductor 59 are permanently connected to the potentiometer slidewire resistance 6 and the interrupter 13A operates to alternately connect the condenser 17 to the thermocouple leads 3 and 4 and to the conductors 58 and 59. As will become apparent, when the condenser electromotive force is identical to that tapped off the potentiometer slidewire resistance by the contact 7, no currents will flow in the potentiometer circuit, but when an inequality exists between the said electromotive forces, a pulse of current will now through resistance 16 during one half of each half cycle of rotation of the interrupter shaft 13B, the direction of flow of said pulse of current depending upon the direction of potentiometer unbalance. The pulsating potential drop so produced across resistance 16 is amplified by amplifier 1 and operates in the manner described in connection with Fig. 1 to cause the selective energization of motor 10 for rotation in one direction or the other.

It is noted that the effects of stray currents in the thermocouple leads can be minimized by employing transformer coupling between the potentiometer and the amplifier as illustrated in Figs. 4 and 7 but the flow of such currents is not entirely eliminated by means of such an arrangement because of the capacitative coupling which exists between the primary and secondary windings of the coupling transformer 16*a*. With the arrangement illustrated in Fig. 11 the flow of such stray currents is entirely prevented so that resistance coupling may be employed between the potentiometric network and the amplifier in lieu of the relative costly transformer coupling thereby effecting a material reduction in the apparatus involved.

Referring to all of the previous arrangements described and particularly to Fig. 1, it is noted that if the sum of the resistance of the thermocouple 2 and the leads 3 and 4 is high, for example, of the order of the value of resistance 11, the latter may be dispensed with and precisely the same anti-hunting effect obtained. As illustrated, in Fig. 12 for example, a photocell 2*a* may be employed in lieu of the thermocouple 2 as the condition responsive device, and since a photocell permits the use of high resistance circuits, it is not necessary to employ a resistance corresponding to the resistance 11 in this arrangement in order to prevent hunting of the system. The photocell may be focussed by means (not shown) on a source of light the intensity of which is to be measured, and, as shown, it receives energizing current from a battery 2*b* through a resistance 2*c* which may be of a suitably high value.

With the light intensity to which the photocell is responsive at a predetermined value, a direct current potential drop of predetermined value will be produced across the resistance 2*c* by the flow of photocell current therethrough and a condenser 17*d* connected across the terminals of the resistance will tend to be charged until the potential across the condenser is equal to that across the resistance 2*c*. The potential so developed across the terminals of the condenser 17*d* is opposed through a circuit, which circuit may be identical to that of the Fig. 1 arrangement and including an interrupter 13, to the potential tapped off a slidewire resistance 6 by a contact 7. When the potential across the condenser terminals is identical to that across the resistance 2*c*, the contact 7 will be in a position along the slidewire resistance 6 such that the electromotive force tapped off the slidewire resistance is equal and opposite to the condenser electromotive force.

On a change in light intensity, for example, on an increase in intensity, the conductivity of the photocell will increase and thereby produce an increase in the potential drop across resistance 2*c*, which increase in potential drop will operate to charge the condenser 17*d* further. The resulting unbalance between the slidewire and condenser electromotive forces will cause an unbalance potentiometer current to flow in resistance 16 which current is pulsating due to the action of interrupter 13 and is readily amplified by the amplifier 1 to selectively control the rotation of motor 10 and thereby the adjustment of contact 7 in the proper direction to reduce the unbalance potentiometer currents to zero. It is noted the flow of unbalance potentiometer currents through the resistance 2*c* will produce a potential drop in the latter in opposition to that produced therein by the photocell current to thereby reduce the effective potential drop across the resistance 2*c*. Thus, as long as unbalance potentiometer currents flow in the circuit, the electromotive force developed across the condenser terminals will not assume the final value of electromotive force as produced in the resistance 2*c* by the flow of photocell current. The operation of this arrangement in producing an anti-hunting effect will thus be seen to be identical to that of the previous arrangements described in that the motor 10 will be energized for rotation until the slidewire and condenser voltages are exactly equalized, at which point the motor energization will be cut off. The coasting of the motor due to inertia will thereafter produce a further change in the slidewire electromotive force to cause the latter to overshoot the instantaneous value of condenser electromotive force. As a result the potentiometer will be unbalanced in the opposite direction and produce an effect energizing the motor for rotation in the opposite direction to thereby quickly decelerate the motor. When the difference between the potential drop produced across the resistance 2*c* by the flow of photocell current and the potential produced across the condenser has been properly proportioned, the motor will then come to rest in a minimum of time with the contact 7 at the exact balance position along the slidewire resistance 6 then corresponding to the value of light intensity to which the photocell 2*a* is subjected.

Figure 13:
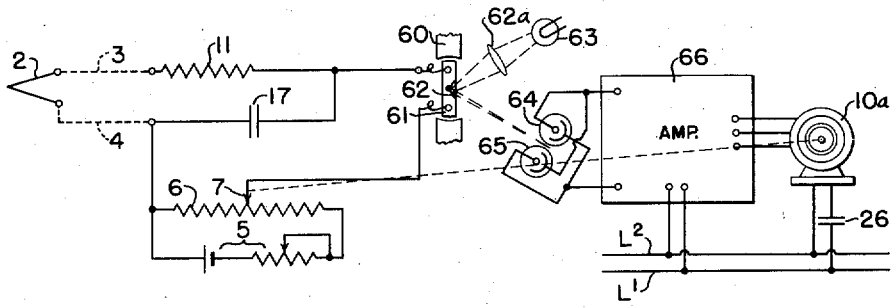
Figure 14:
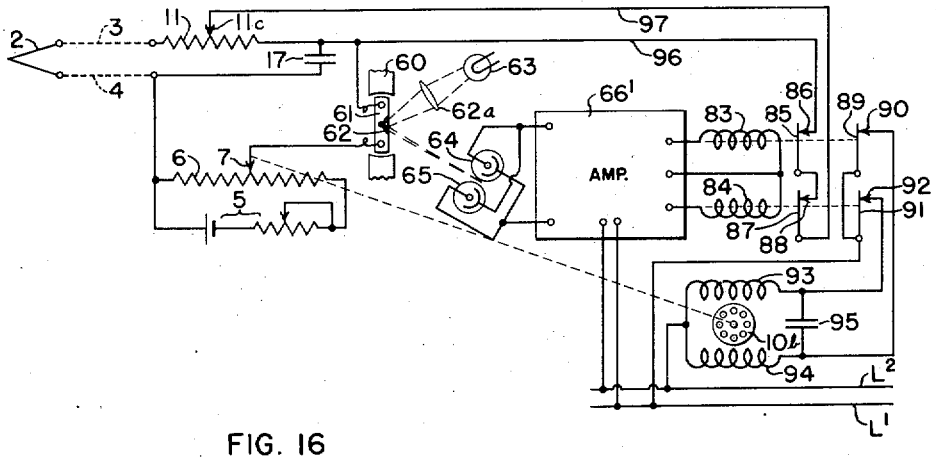

In Figs. 13 and 14 we have illustrated further modifications of the Fig. 1 arrangement which embody our invention, and wherein unbalance of the potentiometric network 5 is detected by a suitable galvanometer 60 having a movable coil 61 on which the unbalance potentiometer currents are impressed, and which deflects in one direction or the other depending upon the direction of potentiometer unbalance. The damping provisions employed in Fig. 4 are identical with those disclosed in Fig. 1 and hence need no further description.

Any suitable means may be employed to detect the movement of the galvanometer coil 61 for producing a potentiometer rebalancing effect, as for example, mounting a switch arm on the galvanometer coil, which switch arm will engage one contact or the other of a relatively stationary reversing switch when the said switch arm deflects from a position between the contacts, but we prefer to use the arrangement illustrated which comprises a mirror 62 carried by the galvanometer coil 61, a relatively stationary source of light or lamp 63, a pair of photocells 64 and 65 connected to the terminals of an electronic amplifier 66 which may be of any suitable type and a lens 62a for focusing the reflected beam of light from the mirror 62 on the photocells.

When the potentiometer circuit is balanced, the galvanometer coil 61 will be in its undeflected position and the beam of light reflected by the mirror 62 shines equally on both photocells. When the galvanometer coil deflects in one direction more light is reflected on one photocell 64 or 65, and upon deflection of the coil in the opposite direction more light is reflected on the other photocell. The current passed by the photocells is amplified by the amplifier 66 and the latter operates when one photocell receives more light than the other to selectively control the energization of a reversible motor 10a for rotation in one direction or the other and thereby the rebalancing operation of the potentiometer. Motor 10a may be exactly like motor 10, but as illustrated, is somewhat different in that half of winding 23 is wound on one field pole and the other half is wound on an oppositely disposed field pole. Similarly, half of winding 24 is wound on the first mentioned field pole and the other half is mounted on the second mentioned pole.

In Fig. 14, an arrangement is illustrated wherein the rebalancing motor is not directly connected to the electronic amplifier but is controlled for rotation by a pair of relatively slow acting relays selectively energized by the amplifier. In this embodiment anti-hunting means are provided which are of especial utility when the motor is energized by slow acting relays. As described in further detail hereinafter, the anti-hunting means are not effective immediately on the occurrence of potentiometer unbalance to cause a delay in the application of the change in thermocouple electromotive force to the potentiometric network, but are effective to cause such a delay when a motor energizing circuit is closed by one of the relays. In other respects the anti-hunting provisions of this embodiment are identical in operation to that of the Fig. 1 arrangement.

As illustrated, the photocells 64 and 65 are connected to the input circuit of an electronic amplifier 66′ having a pair of coils 83 and 84 connected in the output circuit thereof. The amplifier 66′ may be of any suitable type and may be similar to the amplifier 66, if desired, except that suitable provisions are made for connecting coils 83 and 84 in the output circuit instead of the motor windings 23 and 24. The coil 83 is operatively associated with a pair of switch arms 85 and 89, which switch arms are normally in engagement with a respective contact 86 and 90 but are adapted to be moved out of engagement therewith when the coil 83 is energized. The coil 84 is similarly operatively associated with a pair of switch arms 87 and 91 which normally are in engagement with a respective contact 88 and 92, but are adapted to be moved out of engagement therewith when the coil 84 is energized.

The switch arms 89 and 91 are connected together and to the supply line $L^1$ and the contacts 90 and 92 are connected through a respective winding 93 and 94 of a motor 10b to the supply line $L^2$. Motor 10b is a reversible type induction motor and rotates in one direction when the current flow through the winding 93 leads that through the winding 94 and rotates in the opposite direction when the current flow through the winding 94 leads that through the winding 93. The desired shift in phase of the motor currents to produce rotation thereof is produced by means of a condenser 95 connected across the contacts 90 and 92. As noted, both switch arms 89 and 91 are normally in engagement with the contacts 90 and 92 so that motor 10b is then energized for rotation in both directions and remains stationary. When one arm 89 or 91 is moved out of engagement with its associated contact, however, motor 10b rotates in a corresponding direction.

The switch arms 85 and 87 and their associated contacts 86 and 88 are connected in a series circuit including a conductor 96 connected to one terminal of the resistance 11 and a conductor 97 connected to a contact 11c which is adjustable along the resistance 11. The switch arms 85 and 87 are both normally in engagement with their associated contacts and thereby close a low resistance shunt circuit about the resistance 11 to thereby render the latter ineffective to produce its anti-hunting effect, but on energization of relay coil 83 or 84, the said shunt circuit is opened and the resistance 11 is rendered effective to prevent hunting of the system. With this modified arrangement, therefore, the full thermocouple electromotive force will be applied in controlling the operation of the motor 10b at the instant of the occurrence of a change in electromotive force of thermocouple 2, but as soon as the motor is energized for rotation, the anti-hunting means 11 and 17 will be rendered effective to prevent hunting of the motor.

Figure 12:
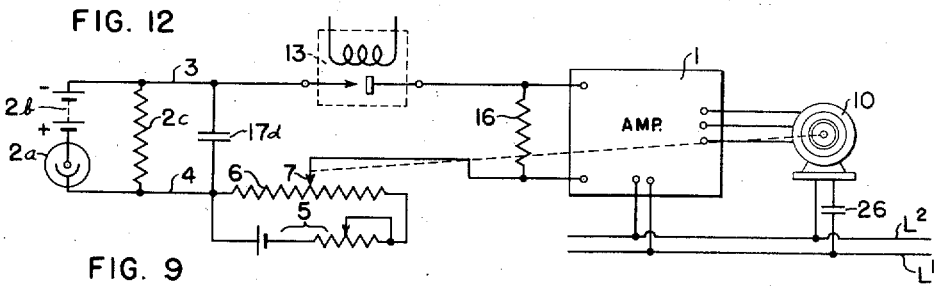
Figure 15:
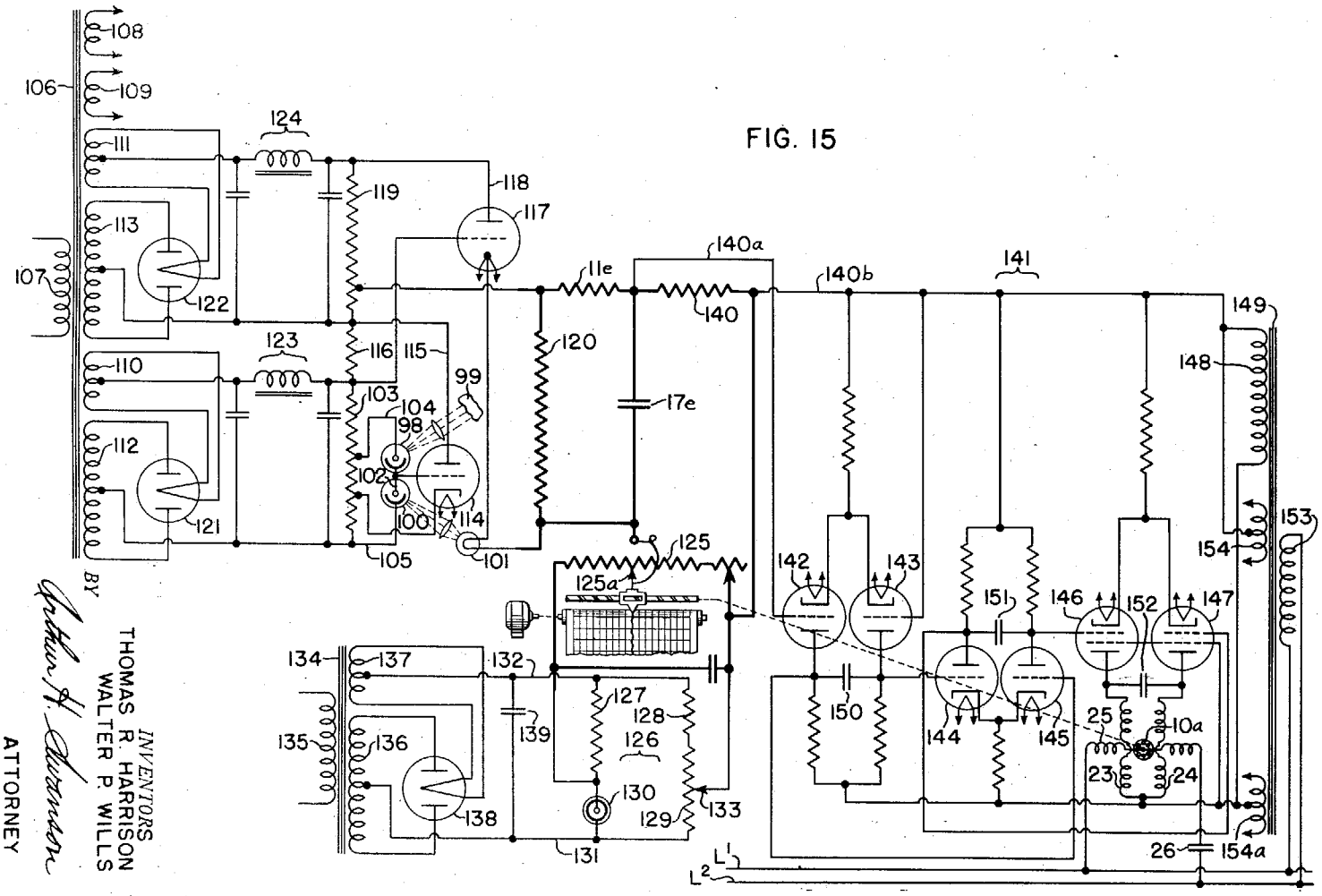

In Fig. 15 we have shown, more or less diagrammatically a modification of the Fig. 12 arrangement illustrating the use of our invention in a self balancing measuring instrument employing a photocell as the condition responsive element. Specifically, the instrument illustrated comprises a photoelectric pyrometer of the general type disclosed in a copending application of Thomas R. Harrison, Serial No. 145,637, filed May 29, 1937, issued into Patent 2,245,034 on June 10, 1941, in which a photocell 98 is arranged to receive light from the interior of a furnace or from an incandescent body 99, and a second photocell 100 is arranged to receive light from a lamp 101, the illumination of which is adapted to be controlled by means responsive to the relative conductivities of the two photocells. The photocells are arranged in an electrical bridge circuit and as the temperature of the incandescent body varies, the illumination of lamp 101 is varied until the illumination of the two photocells is balanced. The magnitude of the lamp energizing current will be a measure of the condition and is measured by a self balancing potentiometric network to be described.

As shown, the two photocells are connected in series relation by a conductor 102 and the series arrangement is connected across a suitable portion of a voltage divider 103 by means of conductors 104 and 105. The photocell 98 is preferably enclosed in a suitable casing (not shown), and the casing is arranged in such manner that the only light which impinges on the cell is that which is to be measured. Desirably, the cell 100 is also suitably enclosed and arranged so that it is subject only to light from the lamp 101.

The voltage divider 103 is energized from a transformer 106 which is a combination step-up and step-down transformer comprising a line voltage primary winding 107, low voltage secondary windings 108, 109, 110, and 111 and high voltage secondary windings 112 and 113. The low voltage secondary winding 108 is connected by conductors, not shown, to the heater filament of an electronic valve 114, and supplies energizing current thereto. Electronic valve 114 is a heater type triode and includes anode, cathode, filament, and control electrode elements and, as shown, the anode thereof is connected to one terminal of the voltage divider 103 by means of a conductor 115 in which a resistance 116 is inserted, the cathode is connected to a point on the voltage divider intermediate the points of connection of the conductors 104 and 105 thereto, and the control electrode is connected to the conductor 102 between the two photocells.

The low voltage secondary winding 109 is connected by conductors, not shown, to the heater filament or cathode of a second electronic valve 117 and supplies energizing current thereto. The valve 117 is a filament type triode and includes anode, cathode, and control electrode elements. The anode is connected by a conductor 118 to the positive terminal of a second voltage divider 119 which voltage divider is energized from the transformer 106 in a manner to be described. As shown, the negative terminal of the divider 119 is connected to the anode of valve 114. A center point on the filament cathode of valve 117 is connected to a point on the voltage divider 119 which is negative with respect to the point of connection of the anode thereto and has connected in circuit therewith the filament of lamp 101 and a resistance 120. The lamp 101 is thus arranged to be energized by the flow of current through valve 117. The control electrode of valve 117 is connected to the positive terminal of the voltage divider 103 so that as the flow of current through valve 114 varies to vary the potential drop across resistance 116, the potential of the control electrode of valve 117 will change with respect to the filament cathode and the supply of current to lamp 101 will vary accordingly.

Electronic valves 121 and 122 are also provided, which valves may conveniently be full wave rectifiers and are employed to maintain direct current potentials across the voltage dividers 103 and 119, respectively. The filament cathode of valve 121 is connected to and receives energizing current from the low voltage secondary winding 110, and the anodes thereof are connected to opposite terminals of the high voltage secondary winding 112. A center tap on the winding 110 and a center tap on the winding 112 are connected to the input terminals of a suitable filter 123 and the output terminals of the latter are connected to the terminals of the voltage divider 103 so that a steady direct current voltage is maintained across the terminals of the divider.

Similarly, the filament cathode of valve 122 is connected to and receives energizing current from the low voltage winding 111, and the anodes thereof are connected to opposite terminals of the high voltage winding 113. A center tap on the winding 111 and a center tap on the winding 113 are connected to the input terminals of a filter 124 and the output terminals of the latter are connected to the terminals of the voltage divider 119 so that a steady direct current voltage is maintained across the terminals of the divider.

When light from the incandescent body 99 is focussed on the photocell 98, the latter becomes more conductive and renders the control electrode of valve 114 more positive relative to the cathode thereof whereby the current conducted by the valve increases to produce an increase in the potential drop across resistance 116. Thereupon, the control electrode of valve 117 becomes more positive relative to its associated cathode resulting in an increase in the current conducted by valve 117 and thereby through the lamp 101. As lamp 101 subsequently brightens, the photocell 100 becomes more conductive and drives the control electrode of valve 114 less positive, and since the latter controls the potential of the control electrode of valve 117, the conductivity of the latter is reduced. This establishes a balanced condition of the illumination of the two photocells, and the energy used by lamp 101 is then an indication of the light being received by the photocell 98.

As previously noted, the current which passes through the lamp 101 also passes through resistance 120 so that a potential drop is maintained across the latter which varies in accordance with the illumination received by the photocell 98 and thereby in accordance with the temperature of the incandescent body 99. This potential drop is opposed to and normally balanced by a measured part of the potential drop maintained across a slidewire resistance 125 by a voltage compensating bridge 126, which bridge operates to maintain the potential drop across resistance 125 constant irrespective of variations in line voltage over a substantial range. The voltage compensating bridge 126 is disclosed in a copending application of Thomas R. Harrison, Serial No. 193,259 filed March 1, 1938, issued into Patent 2,211,114 on August 13, 1940, and includes resistances 127, 128, and 129 in three of its arms and a voltage regulator tube 130 in its remaining arm. Bridge 126 is energized from a suitable direct current source through conductors 131 and 132 which are connected to one pair of conjugate points, and the other pair of conjugate points, one of which is the point of engagement of a contact 133 with resistance 129, are connected to the terminals of the slidewire resistance 125. It is noted variations in the degree of compensation obtained may be effected by adjustment of contact 133 along resistance 129 so that on change in line voltage, the change may be exactly compensated or over compensated or under compensated, as desired.

The source from which the bridge 126 is energized may be any suitable direct current source and, as illustrated, it may be energized through a suitable rectifier circuit from a transformer 134 which is a combination step-up and step-down transformer having a primary winding 135 connected to a source of alternating current, a high voltage secondary winding 136, and a low voltage secondary winding 137. The rectifier circuit referred to may be similar to the rectifier circuits including the valves 121 and 122 and includes a rectifier valve 138 having its filament cathode connected to the terminals of the winding 137 and receiving energizing current therefrom. The anodes of valve 138 are connected to opposite terminals of the winding 136. The conductor 131 is connected to a center tap on the winding 136 and the conductor 132 is connected to a center tap on the winding 137. A condenser 139 is connected between the conductors 131 and 132 for filtering the output current of the rectifier.

As illustrated, a resistance 11e and a resistance 140 are connected in a series circuit with the resistances 120 and 125 so that when the potential drops across the latter are not balanced, the currents which flow as a result of such inequality will flow through resistances 11e and 140. The terminals of resistance 140 are connected by conductors 140a and 140b to the input terminals of an electronic amplifier 141 which amplifier operates to amplify any potential drops produced across resistance 140 as a result of the flow of unbalance currents therethrough and is adapted to selectively control the rotation and direction of rotation of a motor 10a in accordance with the polarity of the potential drop produced across resistance 140. Motor 10a is mechanically connected to a contact 125a, which contact is adjustable along resistance 125 for varying the magnitude of the slidewire potential in opposition to the potential across resistance 120 so that on a change in the illumination of photocell 98 and thereby in the current flow through resistance 120, the contact 125a will be adjusted to a position along slidewire 125 which position corresponds to the new value of current through resistance 120.

The electronic amplifier 141 referred to includes a pair of electronic valves 142 and 143, which valves are heater type triodes including anode, cathode, filament and control electrode elements, and the output circuits of which are directly coupled to the input terminals of a like pair of valves 144 and 145. Valves 144 and 145, in turn, have their output circuits directly coupled to the input terminals of a pair of electronic valves 146 and 147, the latter of which are heater type tetrodes including anode, cathode, filament, screen and control electrode elements, and have a respective motor winding 23 and 24 connected in their output circuits.

Anode voltage is supplied the amplifier from the high voltage secondary winding 148 of a transformer 149, and, as illustrated, valves 144 and 145 are connected across the terminals of said secondary winding in an inverse manner with respect to the connection of valves 142 and 143 and valves 146 and 147 thereacross. That is to say, valves 142, 143, 146 and 147 and valves 144 and 145 will be conductive only during alternate half cycles of the supply line voltage so that the conductivities of valves 144 and 145 will be controlled in accordance with the magnitude of current conducted by valves 142 and 143 during the preceding half cycle and in like manner the conductivities of valves 146 and 147 will be controlled in accordance with the current conducted by valves 144 and 145 during the preceding half cycle. As illustrated, condensers 150, 151 and 152 are provided for each pair of valves, being connected between the anodes of a respective pair of valves, for effecting such control of a successive pair of valves during the next later half cycle.

Transformer 149 is a combination step-up and step-down transformer and includes a line voltage primary winding 153, the high voltage secondary winding 148, and low voltage secondary windings 154 and 154a. The low voltage winding 154 supplies energizing current to the heating filaments of valves 142, 143, 146 and 147 and similarly winding 154a supplies energizing current to the heating filaments of valves 144 and 145, each of the filaments desirably being connected in parallel across its respective energizing winding. It is noted separate filament energizing windings 154 and 154a are provided since the potentials of the cathodes of valves 142, 143, 146 and 147 are widely displaced from that of the cathodes of valves 144 and 145.

Means are provided in this embodiment of our invention, as in the previous embodiments described, for preventing overshooting of the balance point and consequent hunting of the system, said means including the resistance 11e referred to and a condenser 17e connected between the terminal of resistance 11d remote from resistance 120 and the positive terminal of the latter. This anti-hunting arrangement operates in a manner identical to that of the Fig. 1 arrangement and hence it is believed further description is not necessary. It is noted the potentiometer unbalanced currents involved are much greater than those encountered in amplifying thermocouple E. M. F.'s but the principle of operation is the same.

Figure 16:
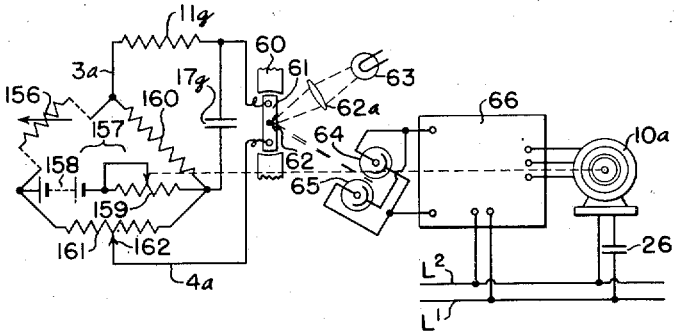
Figs. 16–18 illustrate still further modifications of the arrangement of Fig. 1 and are diagrammatic representations of the use of the invention with electrical bridge networks.
Figure 17:
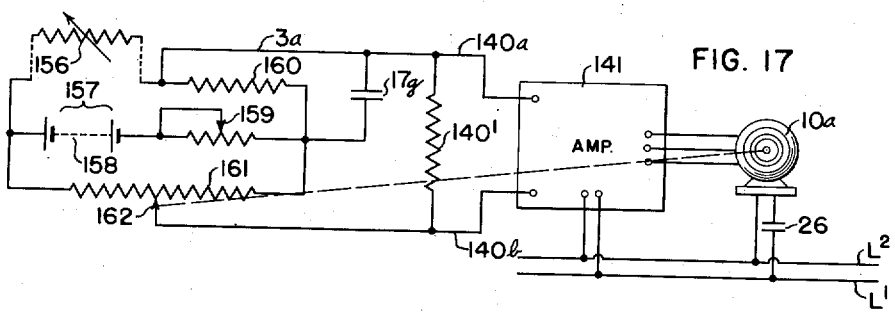
Figure 18:
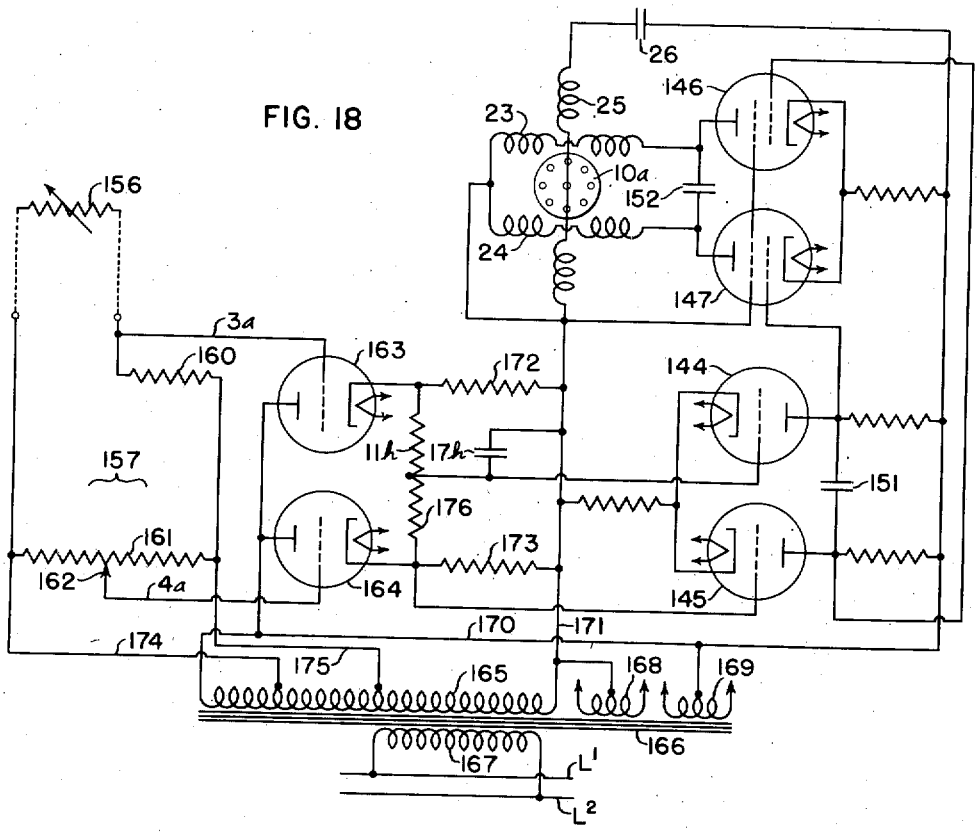

It will be apparent the anti-hunting arrangement of our invention is not limited in its use to potentiometric networks, but that it may be employed with equal facility to other types of electrical networks, for example, with a Wheatstone bridge network, as illustrated more or less diagrammatically in Figs. 16–18. Specifically, an arrangement is illustrated in Fig. 16 for measuring and recording on a chart (not shown) the temperature of a furnace (not shown) to which temperature a device 156 is responsive, said device being illustrated as a coil of material having a substantial temperature coefficient of resistance and connected in one arm of a Wheatstone bridge network 157. It is noted the resistance of the device 156 may be varied in ways other than in response to temperature changes, for example, a physically moving member may be employed to vary the resistance of device 156, or the said device may be the resistance of a substance whose resistance varies in accordance with its moisture content, or it may be so arranged as to have its resistance vary in accordance with the property of a gas whose composition it is desired to ascertain. Energizing current is supplied to one pair of bridge conjugate points from a battery 158 through an adjustable resistance 159 and the other pair of bridge conjugate points are connected by conductors 3a and 4a, in the former of which a resistance 11g is inserted, to the terminals of a galvanometer coil 1, which coil may be identical to the correspondingly identified part of Fig. 4 and the deflection of which selectively controls the direction of rotation of a motor 10a by means of a photocell and amplifier arrangement, as in Fig. 4. The remaining arms of the bridge network 157 are comprised of resistances 160 and 161, variable portions of the latter of which are adapted to be inserted into and taken out of two adjacent arms as a contact 162 in engagement with resistance 161 and connected to conductor 4a is moved along the length thereof. Contact 162 is mechanically connected to motor 10a so that as the latter is energized for rotation as a result of galvanometer deflection, contact 162 will be adjusted to a new balance position to reduce the bridge unbalance which initially caused the galvanometer deflection.

The means provided for preventing overshooting of the balance point and consequent hunting of the system comprise the resistance 11g and a condenser 17g the latter of which is connected across the bridge arm 160 and the resistance 11g. In operation, on a change in the magnitude of the variable resistance 156 and a consequent change in the potential drop thereacross, a corresponding change in potential will immediately be effected across the resistance 160 due to the resulting change in current therein, but due to the action of the resistance 11g the potential across the terminals of condenser 17g will lag behind the potential across resistance 160. As the potential across the condenser terminals changes, the flow of unbalance currents through the galvanometer coil 61 will operate to produce energization of motor 10a for rotation in the proper direction to effect adjustment of the contact 162 along resistance 161 and thereby restore the equality between the condenser and slidewire potentials. As in the previous arrangements described, the change in potential across the slidewire is effective immediately to restore such equality, and the speed of adjustment of contact 162 is sufficiently fast so that before the condenser 17f has assumed its final value of electromotive force, the unbalance currents will be substantially reduced to zero and even reversed in direction and therefore the energization of motor 10a reduced and reversed in direction before the true balance position of the contact 162 has been reached. The inertia of the motor will then carry the contact 162 to the exact balance position wherein it will come to rest.

It is noted that if the values of resistances 156 and 160 are sufficiently high with respect to the remaining bridge resistances, the resistance 11g may be dispensed with and the condenser 17g may be connected directly across the terminals of resistance 160, as illustrated in Fig. 17 and the same anti-hunting effect obtained.

In Fig. 17, we have illustrated a modification of the arrangement of Fig. 16 in which the bridge unbalance electromotive forces are impressed by conductors 140a and 140b directly on the input terminals of an electronic amplifier 141 in lieu of employing a galvanometer to detect bridge unbalance as in the Fig. 15 arrangement. The amplifier 141 and conductors of this arrangement may be identical to the correspondingly identified parts of Fig. 15 and, as shown, has a resistance 140' connected across its input terminals. The amplifier 141 operates to selectively control the energization of motor 10a for rotation in one direction or the other corresponding to the direction of bridge unbalance and thereby the adjustment of contact 162 in the proper direction to reduce the bridge unbalance. Due to the action of condenser 17g the motor will be quickly decelerated as the balance position is reached and come to rest at the exact balance position without overshooting taking place. It is noted that the bridge unbalance currents may be interrupted by means of an interrupter 13 as in the Fig. 1 arrangement and an amplifier 1 employed to detect bridge unbalance if desired.

In Fig. 18 we have illustrated the use of our invention with a Wheatstone bridge network in which the unbalanced electromotive force in the network is first amplified and the amplified quantity is then passed through the anti-hunting network of our invention to control the rotation and direction of rotation of a motor 10a adapted to effect rebalance of the network. Specifically, in Fig. 18 the normally equipotential terminals of a bridge network 157 are connected by conductors 3a and 4a to the control electrode of a respective electronic valve 163 and 164 each of which includes anode, cathode, and control electrodes. Energizing voltage is supplied the valves 163 and 164 from the high voltage secondary winding 165 of a transformer 166 having a line voltage primary winding 167 and two low voltage secondary windings 168 and 169. As illustrated, the left end terminal of winding 165 is connected by a conductor 170 to the anodes of valves 163 and 164 which anodes are connected together, and the right end terminal of the winding is connected by a conductor 171 to the negative terminals of a pair of biasing resistances 172 and 173. The resistances 172 and 173 are connected in a respective cathode circuit of valves 163 and 164. Energizing voltage is also supplied the bridge network 157' from the transformer secondary winding 165 and, as shown, the energizing terminals of the bridge network are connected by conductors 174 and 175 to intermediate points at suitably different potentials on the winding.

When the bridge network is balanced the conductivities of valves 163 and 164 will be substantially identical and potential drops of equal magnitude will be produced across the resistances 172 and 173. These potential drops are applied to the input circuit of a second set of valves 144 and 145 and the output circuits of the latter are coupled to the input circuits of a third set of valves 146 and 147. The valves 144—147 and the coupling circuits therefor may be identical to the corresponding identified parts of Fig. 15. Energizing voltage is supplied the filaments of valves 144, 145, 163 and 164 from the transformer secondary winding 168 and energizing voltage is supplied the filaments of valves 146 and 147 from the winding 169. Anode voltage is also supplied the valves 144—147 from the secondary winding 165. The valves 146 and 147, however, are connected to the winding in an inverse manner in respect to the connection of valves 144, 145, 163 and 164 thereacross.

On unbalance of the bridge network the relative conductivity of the valves 163 and 164 will be varied to thereby produce potential drops of different magnitude across the resistances 172 and 173 in the cathode circuits of the valves. This difference in potential drops operates to control the conductivities of valves 144—147 and thereby the selective energization of motor 10a for rotation in the proper direction to reduce the bridge network unbalance.

The means for preventing hunting of the system in this arrangement includes a pair of resistances 11h and 176 connected between the cathodes of valves 163 and 164, and a condenser 17h connected from the point of engagement of resistances 11h and 176 to the negative ends of resistances 172 and 173. When the potential drops across resistances 172 and 173 are identical, no current will flow through resistances 11h and 176 and consequently the potential across the terminals of condenser 17h will be the same as that across resistances 172 and 173. The potential drop across resistance 173 is applied directly to control the conductivity of valve 145, but the potential drop across resistance 172 controls the conductivity of valve 144 only in so far as it changes the potential on the condenser 17h. Thus, on unbalance of the bridge network, for example, on unbalance in the direction which increases the conductivity of valve 163 and thereby the potential drop across resistance 172, the potential on the condenser will be increased, but due to the flow of current through resistance 11h established as a result of the difference in potential drops across resistances 172 and 173, the condenser potential will not assume the final value of potential across resistance 172 while current flows through resistance 11*h*. Thus, the full amplified effect of the bridge network unbalanced E. M. F. is not immediately applied to the input terminals of valves 144 and 145, but is delayed in a manner identical to that of the anti-hunting arrangements previously described so that the energization of motor 10*a* is reduced before the contact 162 has been adjusted to the position corresponding to the then value of the resistance 156 whereupon the inertia of the motor will operate to effect the adjustment of contact 156 to the exact balance position. It is noted that by properly proportioning the values of resistances 176 and 11*h* and condenser 17*h*, the time required for the condenser to assume the full value of potential across resistance 172 may be made exactly that required for the motor to stop so that when the motor does stop the system will be in exact balance. It is noted further that since the potential across resistance 173 is immediately applied to control the motor rotation the potential drop across resistance 173 may temporarily exceed that across condenser 17*h* to thereby effect energization of the motor for rotation in the opposite direction and consequently fast deceleration of the motor as in the previous arrangements described.

Figure 19:
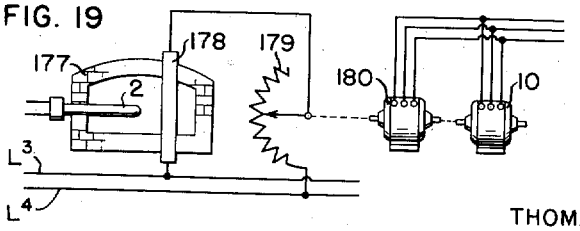
Fig. 19 is a diagrammatic representation of the use of the invention in a control system.

It will be apparent the motors 10, 10*a*, or 10*b* of the various embodiments of our invention disclosed herein may be employed to operate a control valve for controlling the supply of heating agent to a furnace to the temperature of which a thermocouple is responsive, or another motor desirably operated together with any of the above mentioned motors may be so employed. For example, as shown in Fig. 19, a furnace 177 to the heat of which a thermocouple is responsive is heated by a resistance 178 which is connected to electric supply conductors $L^3$ and $L^4$ through a rheostat 179, the adjustment of which is effected by a motor 180. The motor 180 may be exactly like motor 10, for example, and is connected in parallel therewith. The mechanical connection of the rheostat 179 to the motor is such as to increase and decrease the supply of electric current to the resistance 178 as the temperature to which the thermocouple 2 is responsive drops below and rises above a predetermined level.

Certain hunting elimination features disclosed but not claimed herein are disclosed and claimed in a copending application of Thomas R. Harrison Serial No. 263,938 filed March 24, 1939, and issued into Patent 2,312,711 on March 2, 1943.

Other novel subject matter disclosed in Figs. 4, 11 and 15 but not claimed herein is disclosed and is being claimed in an application Serial No. 421,173 filed on December 1, 1941, by Walter P. Wills, and issued into Patent 2,423,540 on July 8, 1947, an application Serial No. 459,638 filed September 25, 1942, by Walter P. Wills, and issued into Patent 2,404,894 on July 30, 1946, and an application Serial No. 459,639 filed by Walter P. Wills on September 25, 1942, and issued into Patent 2,367,914 on January 23, 1945, which subject matter has been divided out of the present application.

While in accordance with the provisions of the statutes we have illustrated and described the best form of our invention now known to us it will be apparent to those skilled in the art that changes may be made in the form of the apparatus disclosed without departing from the spirit of our invention as set forth in the appended claims, and that certain features of our invention may sometimes be used to advantage without a corresponding use of other features.

Having now described our invention what we claim as new and desire to secure by Letters Patent is:

1. The method of restoring the balance of an electrical network which comprises the steps of producing a potential in variable accordance with an original electromotive force in said network to be measured, opposing said potential to a measuring electromotive force, measuring the difference between said potential and said measuring electromotive force, adjusting said measuring electromotive force by means of the energization of motor means adjusting said measuring electromotive force in accordance with said measurement to reduce said difference, and continuing the energization until the difference between said potential and measuring force is zero.

2. The method of restoring the balance of an electrical network which comprises the steps of producing a potential in variable accordance with an original electromotive force to be measured, opposing said potential to a measuring electromotive force, measuring the difference between said potential and said measuring electromotive force, adjusting said measuring electromotive force by means of the energization of motor means adjusting said measuring electromotive force in accordance with said measurement to reduce said difference, and varying said potential according to the rate of adjustment of said measuring electromotive force until the relation between said potential and said original electromotive force is a predetermined value.

3. Measuring apparatus including means for producing a variable electrical effect to be measured, means for producing a standard electrical effect, an electrical network in which said effects are opposed, a device for varying said standard effect, a motor arranged to adjust said device when energized and having the inertia characteristic which produces further adjustment of said device following deenergization, means responsive to unbalance in the effects in said network to selectively energize said motor for rotation in one direction or the other depending upon the direction of said unbalance, and means included in said network to automatically control the opposing of the first mentioned effect to said standard effect in a predetermined manner with respect to time on a change in said first mentioned effect and proportioned to balance said network following a change in said first mentioned effect when the difference between said first mentioned and standard effect is equal to the effect produced by said device under control of said motor following deenergization of the latter.

4. Measuring apparatus including means for producing a variable electromotive force to be measured, means for producing a standard electromotive force, a network in which said electromotive forces are opposed, a device for varying said standard electromotive force, a motor arranged to adjust said device, means responsive to unbalance in the electromotive forces in said network to selectively energize said motor for rotation in one direction or the other depending upon the direction of said unbalance, and means included in said network to automatically control the opposing of the first mentioned electromotive force to said standard electromotive force in a predetermined manner with respect to time on a change in said first mentioned electromotive force and proportioned to balance said network following a change in said first mentioned electromotive force when the difference between said first mentioned and standard electromotive force is equal to the electromotive force produced by said device under control of said motor following deenergization of the latter.

5. Measuring apparatus including means for producing a variable electrical effect to be measured, means for producing a standard electrical effect, a device for varying said standard effect, means for opposing said effects, including means to delay the complete application of the change in said first mentioned effect to said standard effect in accordance with the actuation of said device, means responsive to the unbalance of said effects, and a motor under control of said last mentioned means for adjusting said device.

6. In measuring apparatus, a normally balanced electrical network including means to variably unbalance said network and means responsive to unbalance of said network, a member movable to rebalance said network, a device having inertia and controlled by said means to operate said member, and electric capacity reactance means in said network controlling the unbalancing effect of said first mentioned means to compensate for the inertia of said device as required to prevent hunting of said member.

7. The combination of claim 6 wherein said last mentioned means includes a condenser and an impedance.

8. The combination of claim 6 wherein said last mentioned means includes a condenser and a resistance.

9. The combination of claim 6 wherein said last mentioned means includes a condenser and a resistance connected in parallel relation.

10. The combination of claim 6 wherein said last mentioned means includes a condenser.

11. Control apparatus including means for producing a variable electromotive force to be measured, an adjustable member having inertia and adapted to be moved in accordance with the magnitude of said electromotive force, means to adjust said adjustable member, means responsive to the magnitude of said electromotive force to control said adjusting means, and a connection to apply said electromotive force to said control means, said connection including stationary means therein controlling the application of said electromotive force to prevent hunting of said member.

12. The combination of claim 11 wherein said stationary means includes a condenser and an impedance associated with said condenser.

13. The combination of claim 11 wherein said stationary means includes a condenser and a resistance associated with said condenser.

14. The combination of claim 11 wherein said stationary means includes a condenser and a resistance connected in parallel relation to said condenser.

15. The combination of claim 11 wherein said stationary means includes a condenser.

16. Apparatus for measuring a variable condition including means for producing said variable condition, means for producing a unidirectional electromotive force of magnitude varying with the magnitude of said condition, an adjustable member having inertia to indicate the magnitude of said condition, means to adjust said adjustable member, means responsive to the magnitude of said unidirectional electromotive force to control said adjusting means, and a connection to supply said electromotive force to said control means, said connection including a condenser and resistance therein operating to delay the application of said electromotive force to said control means and thereby to prevent hunting of said member.

17. The combination of claim 16 wherein said condenser and resistance are connected in series relation across said unidirectional electromotive force.

18. The combination of claim 16 wherein said condenser and resistance are connected in parallel relation.

19. Apparatus for measuring a variable condition including means for producing said variable condition, means for producing a source of unidirectional electromotive force of magnitude varying with the magnitude of said condition, an adjustable member having inertia to indicate the magnitude of said condition, means to adjust said adjustable member, means responsive to the magnitude of said unidirectional electromotive force to control said adjusting means, a pair of conductors on which said electromotive force is applied and connected to said control means, and means for preventing hunting of said member including a resistance connected in one of said conductors and a condenser connected from the end of said resistance remote from said source to the other of said conductors.

20. A high speed recorder for recording the variations in an unknown electromotive force under measurement including a source of known electromotive force to which said unknown electromotive force is opposed by a conductive connection, means to vary the magnitude of said known electromotive force, a device responsive to an effect tending to equal the differential between said electromotive forces to control said means, and stationary means in said conductive connection to delay the equalization of said effect and said differential to prevent hunting of said device.

21. A high speed recorder for recording the variations in a unidirectional E. M. F. under measurement including a source of known unidirectional electromotive force to which said unknown electromotive force is opposed by a conductive connection, means to vary the magnitude of said known electromotive force, a device under control of the differential between said electromotive force to control said means, and stationary means in said conductive connection introducing a time delay in the application of a change in said unknown electromotive force to said known electromotive force to prevent hunting of said device.

22. A high speed measuring system comprising a potentiometer network, means for producing an unbalanced electromotive force in said network, an impedance adjustable to rebalance said network, a device for adjusting said impedance, relay means responsive to said unbalanced electromotive force for controlling said device, and means in said network tending to maintain the balance of said network independently of said relay means.

23. In measuring apparatus, a normally balanced unitary network including means to unbalance said network and means responsive to unbalance of said network, a member movable to rebalance said network, a device controlled by said second mentioned means for operating said member, and means in said network tending to maintain the balance of said network independently of said second mentioned means.

24. A measuring system comprising a potentiometric network, said potentiometric network including an adjustable resistance, a second resistance, and a pair of conductors for impressing a source of unidirectional electromotive force on said resistances, a resistance in one of said conductors and having a value substantially higher than the sum of said adjustable resistance and said second resistance, a condenser associated with said third mentioned resistance, a member having inertia to adjust said adjustable resistance, and means connected to said second mentioned resistance to control the adjustment of said member, said third mentioned resistance and condenser operating to prevent hunting of said member.

25. A measuring system comprising a potentiometric network, said potentiometric network including an adjustable resistance, a galvanometer coil, and a pair of conductors for impressing a source of unidirectional electromotive force on said resistance and galvanometer coil, a resistance in one of said conductors and having a value substantially higher than the sum of resistances of said first mentioned resistance and said galvanometer coil, a condenser associated with said second mentioned resistance, a member having inertia to adjust said adjustable resistance, and means under control of said galvanometer coil to control the adjustment of said member, said second mentioned resistance and condenser operating to preventing hunting of said member.

26. The method of restoring the balance of an electrical network which comprises the steps of producing a potential in variable accordance with an original electromotive force in said network to be measured, said potential being substantially equal to said original electromotive force to be measured when said network is balanced but being different from said original electromotive force to be measured when said network is unbalanced, opposing said potential to a measuring electromotive force, measuring the difference between said potential and said measuring electromotive force, adjusting said measuring electromotive force by means of the energization of motor means adjusting said measuring electromotive force in accordance with said measurement to reduce said difference, adjusting said potential in value toward the value of said original electromotive force to be measured in accordance with the adjustment of said measuring electromotive force, and continuing the energization until the difference between said potential and measuring force is zero.

27. The method of restoring the balance of an electrical network which comprises the steps of producing a potential of a value intermediate the value of an original electromotive force in said network under a condition of balance and a value of said electromotive force in a condition of network unbalance, opposing said potential to a measuring electromotive force, measuring the difference between said potential and said measuring electromotive force, adjusting said measuring electromotive force by means of the energization of motor means adjusting said measuring electromotive force in accordance with said measurement to reduce said difference and adjusting said potential in value toward said unbalanced value of said original electromotive force in accordance with the adjustment of said measuring electromotive force, and continuing the energization until the difference between said potential and measuring force is zero.

28. Measuring apparatus including means for producing a variable electrical effect to be measured, means for producing a standard electrical effect, a device for varying said standard effect, electrical connections between said means for opposing said effects, means connected in said electrical connections to delay the complete application of the change in said first mentioned effect to said standard effect in accordance with the actuation of said device, means responsive to the unbalance of said effects, and a motor under control of said last mentioned means for adjusting said device.

29. Control apparatus including means for producing a variable electromotive force to be measured, an adjustable member having inertia and adapted to be moved in accordance with the magnitude of said electromotive force, means to adjust said adjustable member, control means responsive to the magnitude of said electromotive force to control said adjusting means, and a connection to apply said electromotive force to said control means, said connection including stationary means therein controlling the application of said electromotive force to said control means in accordance with the extent to which said adjustable member is adjusted to prevent hunting of said member.

30. A high speed recorder for recording the variations in an unknown electromotive force under measurement including a source of known electromotive force to which said unknown electromotive force is opposed by a conductive connection, means to vary the magnitude of said known electromotive force, a device responsive to an effect tending to equal the differential between said electromotive forces to control said means, and stationary electrical means in said conductive connection to which only currents produced by said known and unknown electromotive forces are applied to delay the equalization of said effect and said differential to prevent hunting of said device.

31. A high speed recorder as specified in claim 30 in which said stationary electrical means comprises a condenser and a reactance.

THOMAS R. HARRISON.
WALTER P. WILLS.

REFERENCES CITED

The following references are of record in the file of this patent:

UNITED STATES PATENTS

| Number | Name | Date |
|---|---|---|
| 1,859,930 | Miller | May 24, 1932 |
| 1,862,595 | Holden | June 14, 1932 |
| 2,105,598 | Hubbard | Jan. 18, 1938 |
| 2,113,436 | Williams | Apr. 5, 1938 |